(12) United States Patent
Wong et al.

(10) Patent No.: US 7,031,759 B2
(45) Date of Patent: Apr. 18, 2006

(54) ROTATING USER INTERFACE

(75) Inventors: Daniel Wong, Wildwood, IL (US); Michael Charlier, Palatine, IL (US); Keith Kinerk, Fontana, WI (US)

(73) Assignee: Motorola, Inc., Schaumburg, IL (US)

( * ) Notice: Subject to any disclaimer, the term of this patent is extended or adjusted under 35 U.S.C. 154(b) by 372 days.

(21) Appl. No.: 10/331,694

(22) Filed: Dec. 30, 2002

(65) Prior Publication Data

US 2004/0127267 A1    Jul. 1, 2004

(51) Int. Cl.
*H04M 1/00* (2006.01)

(52) U.S. Cl. .............................. 455/575.1; 455/550.1; 455/556.1

(58) Field of Classification Search ............ 455/575.1, 455/575.3, 575.4, 566, 556.1, 550.1, 90.3, 455/556.2
See application file for complete search history.

(56) References Cited

U.S. PATENT DOCUMENTS 5,905,964 A * 5/1999 Sudo .......................... 455/566
6,325,719 B1 * 12/2001 Fukawa et al. ............... 463/37
6,549,789 B1 * 4/2003 Kfoury ..................... 455/550.1
6,768,899 B1 * 7/2004 Janninck et al. ............ 455/566
2002/0198006 A1 * 12/2002 Hirayama et al. .......... 455/456

FOREIGN PATENT DOCUMENTS

DE         3323858 A1 *  1/1985

OTHER PUBLICATIONS

User guide for a bang & Olufsen Beocom 6000.*

* cited by examiner

*Primary Examiner*—Quochien B. Vuong
*Assistant Examiner*—Lewis West
(74) *Attorney, Agent, or Firm*—David S. Noskowicz; Lawrence J. Chapa

(57) ABSTRACT

A rotating user interface for a portable electronic device (FIG. 2, through FIG. 5 et sequence) includes a circular portion that rotates relative to a housing portion. Rotation of the rotating user interface controls motion on a display such as a steering wheel for a gaming mode of the device. A moveable user interface includes a plurality of keys (206, 208) arranged and constructed to be configured in one of a first configuration (FIG. 2) and a second configuration (FIG. 3); and a controller 102, coupled to the plurality of keys, operable to detect when the plurality of keys are in the first configuration or second configuration and correspondingly to control the device to perform a first function or second function corresponding to the detected configuration.

14 Claims, 8 Drawing Sheets

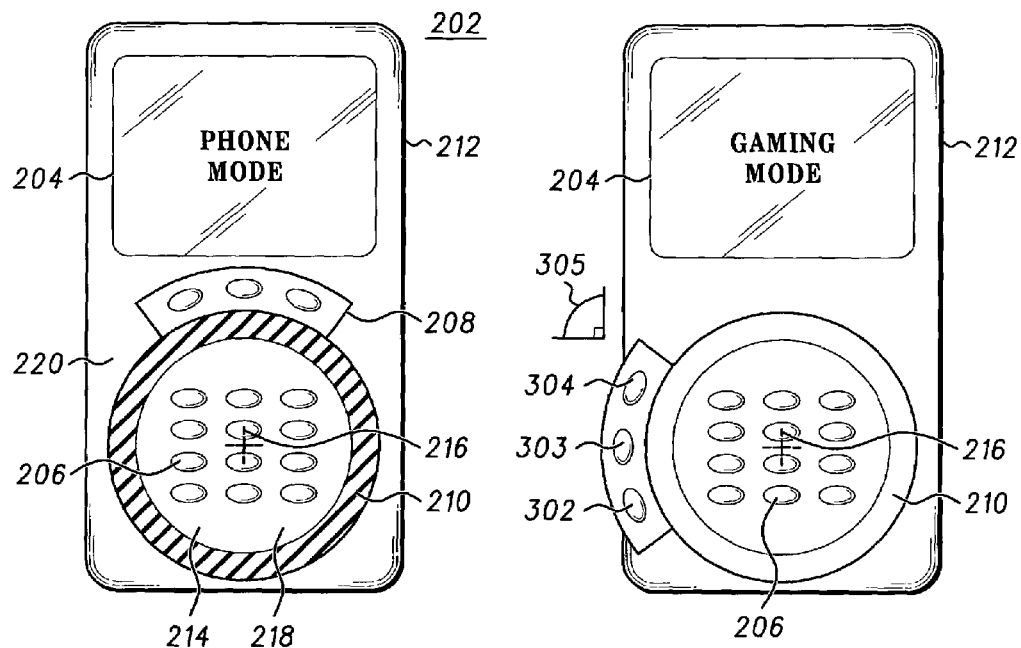
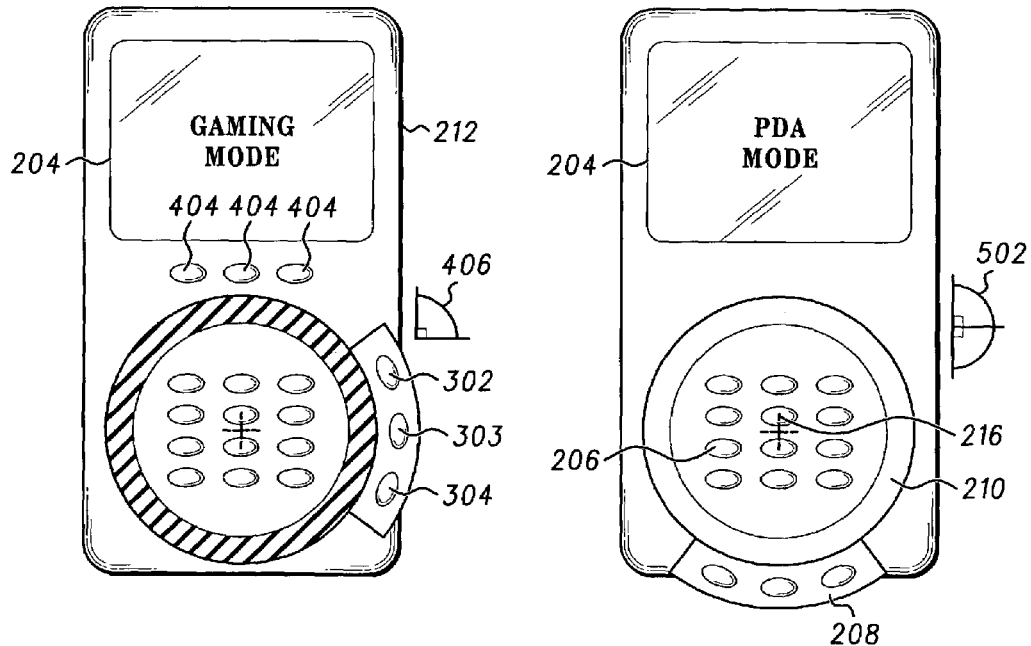

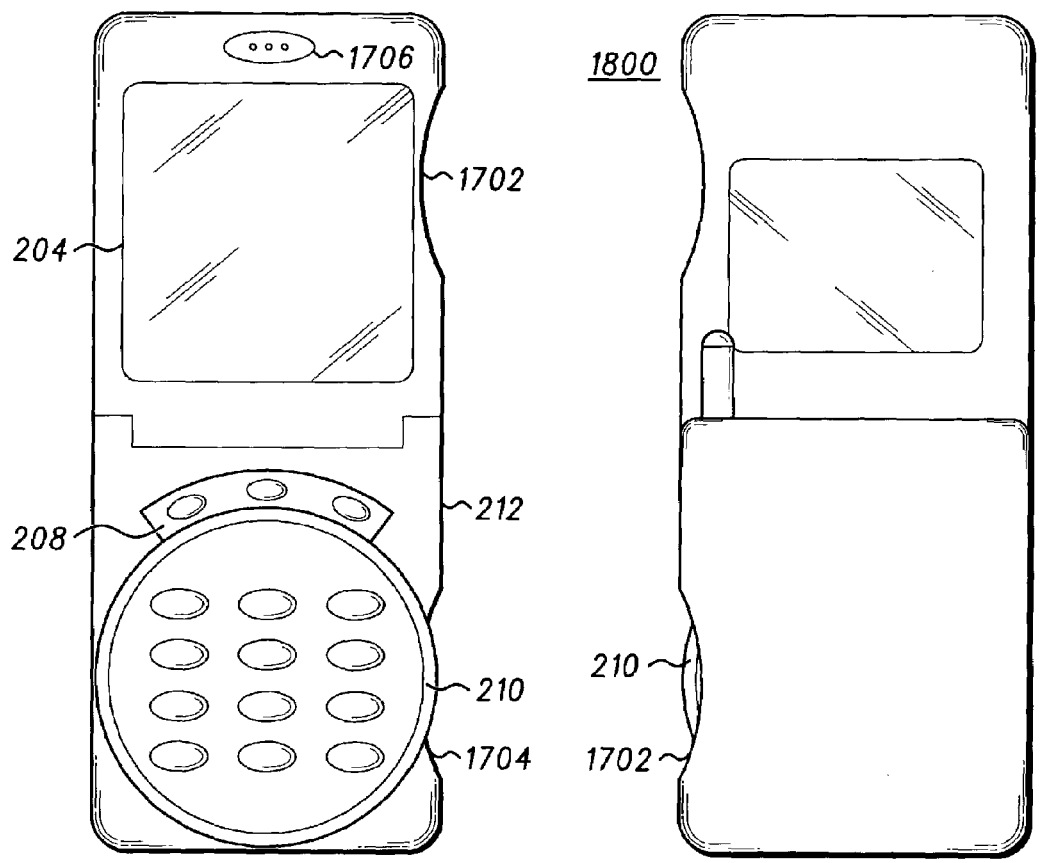
FIG. 17    FIG. 18
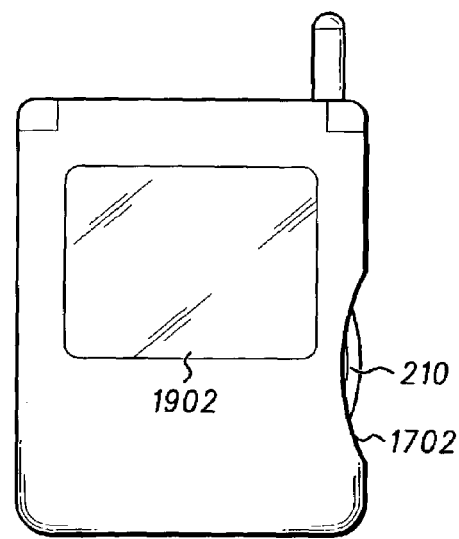
FIG. 19

ROTATING USER INTERFACE

FIELD OF THE INVENTION

This invention relates in general to user interfaces, and more specifically to a device having a rotatable user interface.

BACKGROUND OF THE INVENTION

Portable electronic devices, particularly wireless communication devices, may incorporate features or portions of the device that increase both functionality and ease of use by the user.

Clamshell style cellular communications handsets that operate the hook switch when a hinged portion of the housing is opened and closed are known generally. In addition the V.70 cellular telephones by Motorola, Inc. includes a rotatable blade used as a hook switch detector that transitions the phone between stand-by and active modes depending on the position of the blade.

The ability to control the operation of the device in view of increased functionality has required increasing the number of buttons or increasing the number of functions assigned to individual buttons or both. In either case, the complexity of operation increased and intuitive control decreased.

Gaming devices are also known however the user interfaces thereof are generally device or game specific. The merger of wireless communication devices and gaming has further increased the complexity of the user interface while reducing ease of use. There is little or no similarity between the user interface for a typical wireless communication device and a handheld gaming device and thus the user interface of a combination unit is complex and not user friendly.

Accordingly, a system is needed to improve the control of the gaming wireless device, yet maintain the outward appearance that the end user desires. Providing a means to easily configurable portions of the device while maintaining the integrity and robustness of the device is needed.

The various aspects, features and advantages of the present invention will become more fully apparent to those having ordinary skill in the art upon careful consideration of the following Detailed Description of the Invention with the accompanying drawings described below.

BRIEF DESCRIPTION OF THE DRAWINGS

The accompanying figures serve to illustrate various embodiments and to explain various principles and advantages all in accordance with the present invention.

FIG. 2 is a front elevation view of an exemplary embodiment of a handheld device with a rotatable user interface;

FIG. 3 through FIG. 5 are additional front elevation views of an exemplary embodiment of a handheld device with a rotatable user interface;

FIG. 17 is an exemplary front view of a housing in an open configuration;

FIG. 18 is an exemplary back view of a housing in an open configuration;

FIG. 19 is an exemplary front view of a housing in a closed configuration;

DETAILED DESCRIPTION OF PREFERRED EMBODIMENTS

The present invention is a device that has multiple functions such as wireless communicating, handheld computing, and gaming. More particularly various inventive concepts and principles are embodied in the adaptable user interfaces and methods for providing such devices with ease of use and limited complexity. Any combination of functionality is possible; a gaming device with a cell phone portion, a cell phone with a gaming portion or any combination of a number of functionalities including, messaging, internet browsing, personal organizer (personal digital assistant capabilities) or the like. Although not required these more feature rich subscriber devices often are arranged and constructed to operate on higher bandwidth systems such as GPRS (General Packet Radio System) systems, or wideband CDMA (code division multiple access) systems or systems that are packet data enabled and that enable connectivity or sessions with IP (Internet Protocol) based networks, including for example packet data based systems such as $3^{rd}$ generation or UMTS (Universal Mobile Telephone Services) systems.

As further discussed below various inventive principles and combinations thereof are advantageously employed to provide unique controls for specific functions. At the same time also allowing alternative operating combinations and user interface layouts of a handheld device depending on user actions, desires, and preferences, thus alleviating various problems associated with known user interfaces while facilitating a fuller range of features, options and applications for the device.

The handheld electronic device comprises at least a first housing portion and a rotatable user interface coupled to the first housing portion. The rotatable user interface is a steering wheel when the device is in a gaming mode and a device which controls scrolling in other modes such as a radiotelephone mode or a PDA mode. The device further employs a rotation sensor coupled to the rotatable user interface. This senses the rotation of the rotatable user interface and communicates rotation characteristics to the microprocessor for processing in accordance with the appropriated operating mode. In addition to the rotatable user interface or steering wheel, the device further includes a second user interface that in one embodiment is a configurable user interface wherein at least a portion thereof has a configurable user interface movable portion that is movable relative to said housing portion and said rotatable user interface. The controller is coupled to the configurable user interface and the rotation sensor, operable to receive signals from both the configurable user interface and said rotation sensor. This may also be accomplished by two separate sensors, a first sensor and a second sensor.

Figure 1:
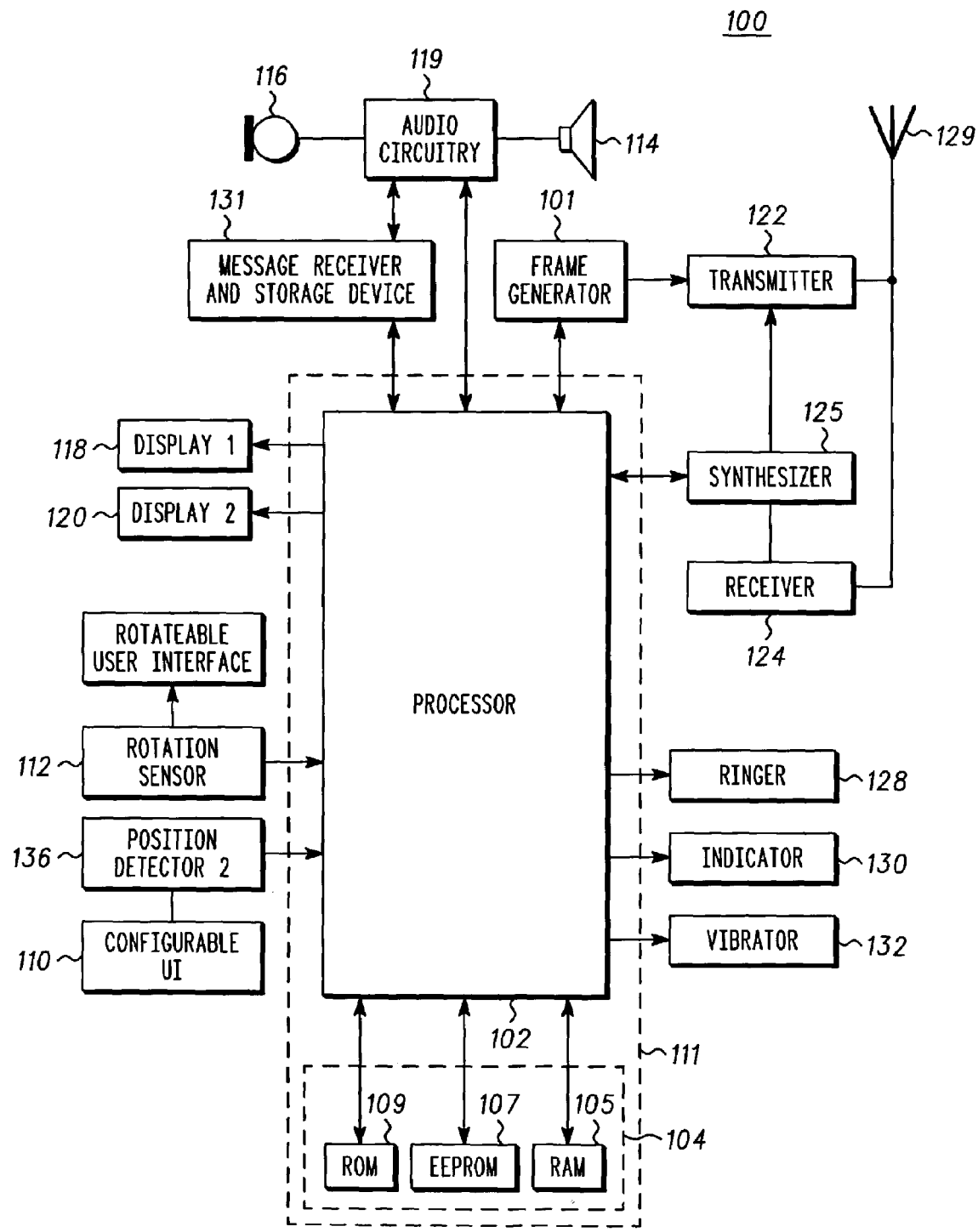
FIG. 1 is an electrical block diagram of an exemplary embodiment of a handheld wireless device.

FIG. 1 is an electrical block diagram illustrating a circuit 100 portion of a handheld portable communication device. Circuit 100 includes a controller 102, which may be a microprocessor, a micro-controller, a digital signal processor (DSP), a programmable logic unit, or a combination thereof. For example a 6800 microprocessor available from Motorola may be used. Controller 102 can include volatile memory 104, which may for example be random access memory (RAM) 105, and non-volatile memory, which may be implemented using Electronically Erasable Programmable Read Only Memory (EEPROM) 107, Flash Read Only Memory (ROM) 109, Electronically Programmable Read Only Memory (EPROM), or the like. Controller 102, or Central Processing Unit (CPU), selectively controls the operation of portable communication device including the manner in which user interfaces control functions of the device.

The memory includes additional routines that represent configuration detection and operational functionality including two or more of telephone, gaming, personal digital assistant, web browsing, and others. Of course the gaming functionality would likely include a plurality of games that may be selected. Display drivers may be included in the controller 102 which are used to drive the display appropriately depending on the configuration of the plurality of keys and other device status information.

Controller 102 receives signals from the rotation sensor 112. The rotation sensor 112 sending signals to the controller 102 as the rotational user interface is moved. Controller 102 also receives inputs from the configurable user interface 110. The configurable user interface 110 or a plurality of keys or set of keys provides signals to the controller 102 and further includes, preferably one or more navigation keys, numeric keys, and other or additional keys. The plurality of keys or some portion thereof is arranged and constructed to assume or be arranged in two or more physical configurations with for example one configuration facilitating telephone functions and other configurations facilitating gaming functions, etc. The particular configuration is communicated to the controller via the position-sensing switch 136. It is possible that some of the keys may be a physical key or a virtual key that is part of the display. Controller 102 is further connected to speaker 114 that outputs audio and microphone 116 that inputs audio. Controller 102 drives display 118, through the use of a display driver that is used to show information to the user. The display is also known and may be a liquid crystal display or the like. A second display may also be connected to the controller 102.

Antenna 129, a radio frequency (RF) input, is connected between transmitter 122 and receiver 124. Transmitter 122 transmits data from controller 102 and receiver 124 receives data and relays the information to controller 102. Ringer 128, alert 130, and vibrator 132 are alerts for the user and are coupled to controller 102. The ringer 128 and alert 130 may also be used in conjunction with the gaming function of the device to provide a interactive feel and enhance the experience of the game.

Turning to FIG. 2, a front elevation view of an exemplary embodiment of a handheld device 202 with a rotatable user interface is shown. The device has a display 204, and a plurality of keys comprising at least numeric keys 206 and a rotatable user interface 210. In one embodiment the plurality of keys also comprises a configurable user interface which in the embodiment shown are configurable keys 208. It should be noted that the different configurations are of any of the keys, preferably, physical arrangements or rearrangements of the keys are possible.

The rotatable user interface 210 is coupled to a first housing portion 212 of the handheld device 202 and although not shown in FIG. 2, to a rotation sensor. The rotation sensor senses or detects rotation of the rotation device relative to the first housing portion 212 of the handheld device 202. Although the rotatable user interface 210 is circular in the exemplary embodiment shown in FIG. 2, this is not necessary. The rotatable user interface 210 may take on any shape as long as it is rotateable relative to the housing 212.

In an exemplary embodiment the rotatable user interface 210 is adjacent to a protruding portion 214 of the first housing portion 212. The protruding portion 214 is cylindrical having side walls 604 (FIG. 6) and a circular top 218 wherein the numeric keys 206 are disposed upon. The protruding portion 214 along with the numeric keys 206 may rotate with the rotatable user interface 210 or remain stationary. In the latter embodiment, the numeric keys 206 are disposed upon the protruding portion 214 while the rotatable user interface 210 rotates around the protruding portion 214. The rotatable user interface 210 rotates about an axis of rotation 216. In one embodiment the circular top 218 of the protruding portion 214 is in the same plane as a first surface 220 of the first housing portion 212. In the exemplary embodiment shown the axis of rotation 216 is substantial perpendicular to the first plane of both the circular top 218 of the protruding portion 214 and the first surface 220 of the first housing portion 212. In another exemplary embodiment the rotatable user interface 210 is positioned off-axis or where the axis of rotation 216 is at an angle less then 90 degrees perpendicular to the circular top 218.

The rotatable user interface 210 can rotate freely 360 degrees and beyond or be limited to only rotate to a desired angle, less than 360 degrees. The rotatable user interface 210 may also be connected to a recoil mechanism, such as a spring, that returns the rotatable user interface 210 to a first position when the user releases rotatable user interface 210. This is generally known as self centering and is used in gaming devices and motion control.

In the exemplary embodiment shown, the rotatable user interface 210 is a steering wheel 210 which is allowed to rotate about the first axis 216 freely. It does not however necessarily need to rotate freely as discussed above. The steering wheel can take on numerous shapes from a single bar that is connected at a center column or as shown in FIGS. 2 through 5, as a wheel wrapping substantially around the protruding portion 214 of the first housing portion 212. This latter configuration allows the numeric keys 206 to be encompassed by the steering wheel 210. The combination of the rotatable user interface 210 and the numeric keys 206 allow the device to easily adapt to either a data entry device such as for a cell phone or for a gaming device where the rotatable user interface is used to control or steer motion in games. This is done without attaching any accessories to add functionality to the device as it is built in to the device. This feature may be advantageously used, for example, to simulate as mentioned the steering wheel or airplane control yoke or controlling action figures as they run through a course or the like for games that may require such functions. The rotatable user interface 210 may also be used while the device is in data entry mode for scrolling information on the screen.

One exemplary embodiment provides that the configurable user interface 208 of the plurality of keys are configurable keys 208 that may operate autonomously or in conjunction with the rotatable user interface 210 or the numeric keys 206 or in any combination thereof. The configurable keys 208 are configured for a first set of functions in a first physical arrangement or orientation and are configured for a second set of functions in a second physical arrangement relative to the first housing portion 212 of the configurable keys 208. Four different arrangements or configurations are depicted by FIG. 2 through FIG. 5.

Game control units or controllers that have the configurable keys 208 arranged to the side of the first housing portion 212 and the numeric keypad as in FIG. 3 provide a more typical layout concerning gaming type devices. However a typical layout of a keypad for a cellular phone, for example as shown in FIG. 2, locates most or many of the navigation or keys other than the numeric keys in a vertical relationship to the numeric keys rendering the phone nearly useless or at least quite difficult for playing many different types of games. The users hands interfere with each other, often overlapping, when attempting to execute required gaming maneuvers. A much more comfortable and useful layout in conjunction with the rotatable user interface results when the configurable keys 208 for the game are horizontally arranged to the side of the numeric keypad as in FIG. 3 and FIG. 4.

FIG. 3, FIG. 4, and FIG. 5, which illustrate additional front elevation views of a device depicting a variety of configurations of the configurable keys 208, relative to the rotatable user interface 210 are described. For example, FIG. 3 depicts a configuration wherein the configurable keys 208 are shown rotated at an angle 305 to a horizontal relationship with the numeric keys 206. The display 204 shows in an exemplary fashion that the subscriber device 202 is in a gaming mode 304 in this configuration. In each of these configurations, the rotateable user interface 210 is flexibly accessible to the user depending on the mode of operation.

Referring to FIG. 4, the display 204 is representatively shown displaying a further gaming mode. In this configuration, the plurality of keys including configurable keys 206 are shown rotated at an angle 406 to a horizontal relationship with the numeric keys where the rotation has revealed the additional keys 404. Note that this configuration may facilitate use by right-handed users, as the navigation keys 208 are positioned to the right of the numeric keys 206. This in contrast to the configuration shown in FIG. 3 wherein the configurable user interface 208 is positioned to the left of the numeric keys 206, thus perhaps facilitating use by left-handed users when in a gaming mode. In addition to the physical arrangement of the configurable keys 208, each individual key of the configurable keys may be configured to a certain function based on either user preferences or the physical arrangement thereof. For instance in FIG. 3, keys 302, 304 and 305 make up the keys of the configurable keys 208. The top key 304 (at the top in the configuration in FIG. 3) may be assigned a specific function while the configurable keys 208 are rotated to angle 305. However the same function may be mapped to key 302 (the top key in the configuration in FIG. 4) when the configurable keys 208 are rotated to angle 406 illustrated in FIG. 4.

For example, in a gaming mode where the configurable keys 208 are configured to the right of the rotateable user interface 210, as shown in FIG. 3, key 304 is configured for forward motion of information on the display 204. This is logical because relative to the display 204 and the user, key 304 is the most forward key. On the other hand, if the configurable keys 208 are to the right of the rotateabel user interface 210, as shown in FIG. 4, key 306 is the most forward key. In this case, the forward motion would be mapped to key 306. This "re-configuration" can be automatic, depend on the mode of the device, or be user configurable.

FIG. 5 depicts a configuration wherein the navigation keys 208 are shown rotated at an angle 502 to a vertical or reverse vertical relationship with the numeric keys 206. The display 204 shows that the subscriber device 201 is in a PDA mode in this configuration. By reflecting on the different configurations you will note that a subscriber device has been shown where one or more of the plurality of keys, for example the configurable user interface 208 is rotated and positioned at a first angle relative to others of the plurality of keys, such as the numeric keys when in a first configuration, and that the one or more of the plurality of keys is rotated and positioned at a second angle relative to the others of the plurality of keys when in a second configuration. In this case the device may be rotated side ways such that the display 204 the rotatable user interface 210 and the configurable keys 208 are aligned horizontally.

In one embodiment that illustrates the present invention having the plurality of keys includes a two-piece keyboard with a stationary numeric keypad that captures the rotating set of navigation keys between the housing for the subscriber device and the numeric keypad. Preferably, the numeric keypad includes a snap action or quarter turn latching mechanism to fasten the numeric keys and thus rotating keys to the subscriber device housing. A bearing surface on one or both of the subscriber device housing and numeric keypad provides a bearing surface for the rotating keypad to rotate about. A detent system or latching arrangement is preferably arranged to hold or bias the navigation keys or rotating portion to or in one of the predetermined locations depicted in FIG. 2 through FIG. 5. The detent system relies on a slight interference fit between two parts as is known, whereas an on/off latching mechanism may be more suitable if the rotating keys or portion will be used for continuous or quasi-continuous positioning. An optical position sensor may be accommodated via an opening in the subscriber device housing located below the rotating portion and a known pattern on the rotating portion. The position sensing switch would rely on a proximity relationship between electrical circuits or a contact only available at the predetermined positions corresponding to one of the configurations.

Figure 6:
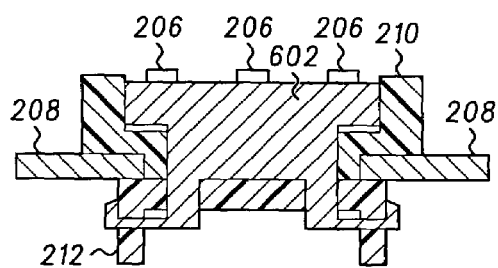
FIG. 6 is an exemplary cross section of the rotatable user interface.

Turning to FIG. 6, a cross section of the device is shown and for purposes of clarity, only the steering wheel 210 the configurable user interface 208, the numeric keys 206 and the first housing portion 212 are illustrated. This configuration of the components represents an embodiment of the present invention. The rotatable user interface 210 and the configurable user interface 208 rotate independent of one another. Therefore each rotating component is coupled to a mechanism that allows rotation. The rotatable user interface 210 may be connected to the protruding portion 602 of the first housing portion 212 to a rotating mechanism therein or connected directly to the first housing portion 212 through the same type of rotating mechanism. The rotating mechanism may be a ball bearing race that allows the interface as a steering wheel 210 to rotate freely and smoothly. In one embodiment the configurable user interface 208 or at least a portion thereof is retained by the rotatable user interface. This prevents the configurable user interface 208 from separating from the first housing portion 212. In this example, the first housing portion 212 retains the rotatable user interface 210 and the rotatable user interface 210 retains the configurable user interface 208.

Mechanical stops may be put in place if it is desired for the steering wheel 210 to only rotate to certain positions. The steering wheel 210 may also be directly connected to a potentiometer. The potentiometer would provide two functions: rotational movement as well as the positional or rotational sensor that senses the position of the steering wheel relative to the first housing portion 212. Where the rotating mechanism portion is a ball bearing race for example, an additional sensor will need to be present in order to sense or detect the location or position of the steering wheel 210. Those skilled in the art will appreciate the mechanisms available for allowing rotation of the rotatable user interface 210 as there are multiple devices capable of satisfying this application.

The configurable user interface or configurable keys 208 may employ the same mechanism of rotation as described above. The configurable user interface 208 would also have to incorporate leads for coupling the actual keys of the configurable user interface 208 to the microprocessor 102 located in the housing.

Figure 7:
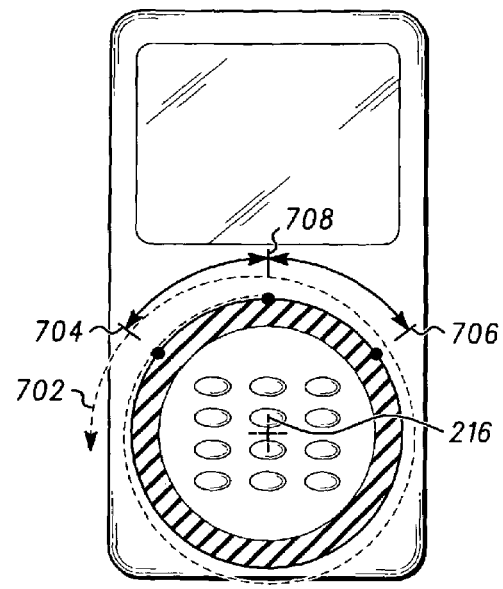
FIG. 7 is an exemplary view of the rotatable user interface.

Now turning to FIG. 7, the rotational user interface is shown rotating freely about the first axis 216, indicated by arrow 702. The rotatable user interface may rotate freely in either a clockwise or counterclockwise direction. Further, FIG. 7 depicts the rotatable user interface rotating only to an angle 704 and 706. In this case the rotatable user interface 210 may rotate freely to the position indicated by angles 704 and 706 or in the self centering fashion as described above. In the exemplary embodiment where the rotatable user interface is a self-centering device the rotatable user interface would rotate back to position 708, which is a point between positions 704 and 706, which may be a mid-point.

Figure 8:
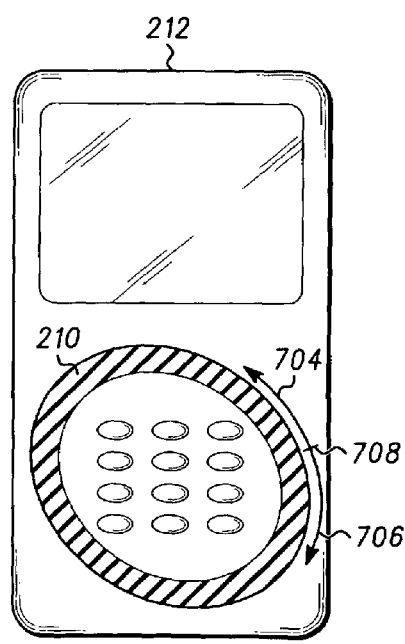
FIG. 8 is an exemplary view of the rotatable user interface.
Figure 9:
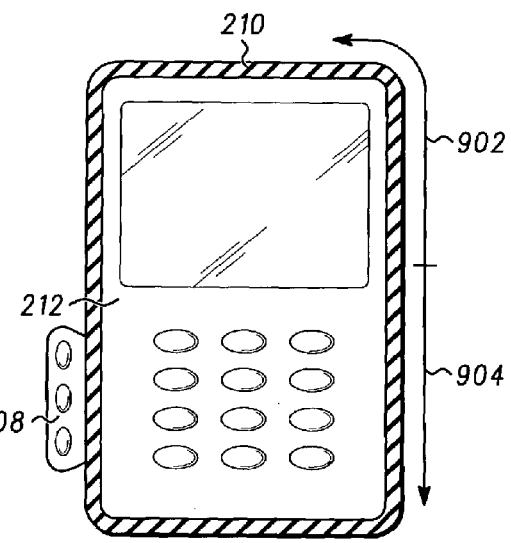
FIG. 9 is an exemplary view of the rotatable user interface.

The rotatable user interface may also be a continuous piece of formable material that is allowed to rotate and is not necessarily circular. A rubber strip that moves or rotates in a track is one exemplary embodiment. As shown in FIGS. 8 and 9, the rotatable user interface may take on any form including an oval or the shape, or substantially the same shape as the device. In either case the rotatable user interface 210 rotates in a clockwise and a counter clockwise direction as illustrated by arrows 704, 706, 902, 904 in both FIGS. 8 and 9. In FIG. 9 the user may hold onto the device by holding the configurable user interface 208 in one hand and the rotatable user interface 210 in the other hand.

Figure 10:
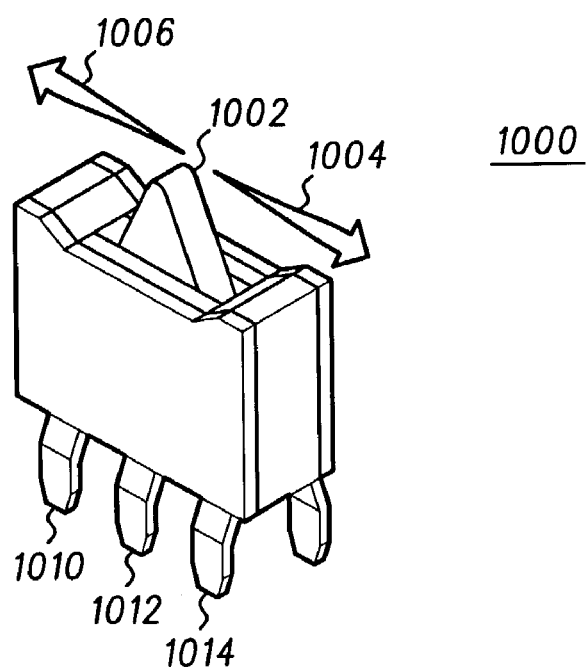
FIG. 10 is an exemplary view of a rotation sensor.

The rotatable user interface sensor 112 may be one of many types of sensors or detectors used to determine rotational movement and position. Converting the mechanical rotational motion of both the rotatable user interface 210 and the configurable user interface 208 into electrical signals that are sent to the processor 102 is done with switches or sensors coupled to either of the user interfaces, mechanically or optically and the first housing portion 212. In FIG. 10 a switch 1000 is shown. This switch is a detector switch, such as an ESE 23 or ESE 24 from Panasonic. The switch lever 1002 in a normally open position when it is in a first or stationary position. The switch lever 1002 can move in two directions, a first direction 1004 and a second direction 1006. The switch lever 1002 is spring loaded such that a force applied in either direction moves the switch lever 1002 and when the force is removed from the switch lever 1002, the switch lever 1002 will spring back to the first or stationary position.

When the switch lever 1002 is moved in the first direction 1004, a first circuit between the contacts 1010 and 1012 is complete or closed and when the switch lever 1002 is moved in the second direction 1006, a second circuit between the contacts 1014 and 1012 is completed or closed.

Figure 11:
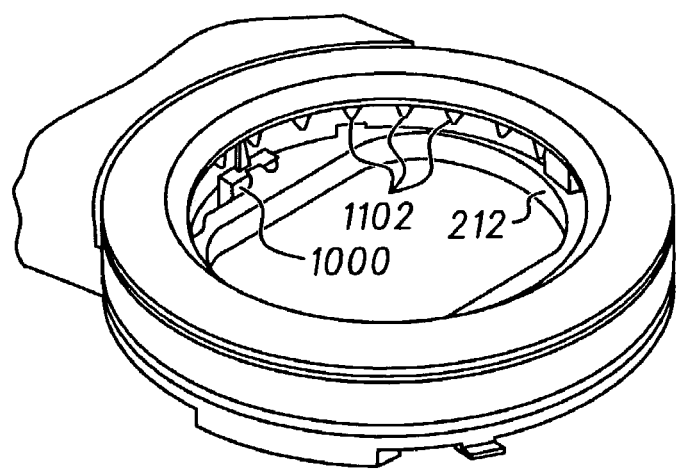
FIG. 11 is an exemplary view of the bezel input device invention.

This switch 1000 is coupled to the housing 212 as shown in FIG. 11. The switch lever 1002 is position such that it will selectively couple with actuators or teeth 1102 which are coupled to the rotatable user interface 210. The teeth 1102 rotate with the rotatable user interface as it rotates, the teeth 1102 selectively couple to the switch lever 1002 and depending on the direction of rotation, move the lever in either the first direction 1004 or the second direction 1006. In the instance discussed above where the rotatable user interface 210 has a hard stop and rotates less than 45 degrees, to angle 704 or 706 only one actuator or tooth is coupled to the rotatable user interface 212. When the rotatable user interface 210 is rotated a first actuator couples with the switch lever 1002 and moves the switch lever in the first direction 1004. The circuit between 1010 and 1012 is closed and a signal is sent to the processor 102. The processor generates the command to move the information, including graphics, in upward or towards the top of the display 204. When the rotatable user interface 210 is rotated to the third position 704, a second actuator couples with the switch lever 1002 and moves the switch lever 1002 in the second direction 1006. The circuit between 1010 and 1012 is closed and a signal is sent to the processor 102. The processor generates the command to move the information upward or towards the top of the display 204.

In the case of the freely rotating user interface 210, a plurality of teeth 1102 are selectively coupled to the rotatable user interface 210 as the rotatable user interface 210 rotates in either direction. Each time a tooth couples with said switch lever 1002, the switch lever 1002 is moved in the first or second direction, depending upon the rotation direction of the rotatable user interface 210, and either the first circuit or second circuit is closed. Rotating the rotatable user interface 210 in one direction allows a plurality of teeth to selectively couple to the switch lever and repeatedly move the switch lever in the same direction. The affect is that the information on the display 204 is moved in one coinciding direction.

The microprocessor or processor 102 can be configured to control the motion of the information on the display 204 in conjunction with the input from the rotatable user interface 210. For example, in one instance, the release of the rotatable user interface 210 allowing it to return to the first position 708, automatically stops the motion of the information on the display. If the rotatable user interface 210 is not spring loaded, the user may rotate the user interface 210 manually back to the first position 708 to stop the moving motion. In another instance, the information on the display continues to move once the user interface 210 is released and returns to the first position. In order to stop the motion of the information on the display 204, the rotatable user interface 210 must be rotated from the first position 708 in the second direction to the third position 704. In the first position 708, the information on the display 204 does not move. The multiple teeth allow for proportional control of the information on the display 204. The information is moved proportional to the movement of the rotatable user interface 210.

The relative positions of the rotatable user interface 210 and the configurable user interface 208 may also be detected by a rotary encoder having a first encoder portion coupled to one of the housing portions and a relatively fixed encoder portion coupled to the other housing portion.

Figure 12:
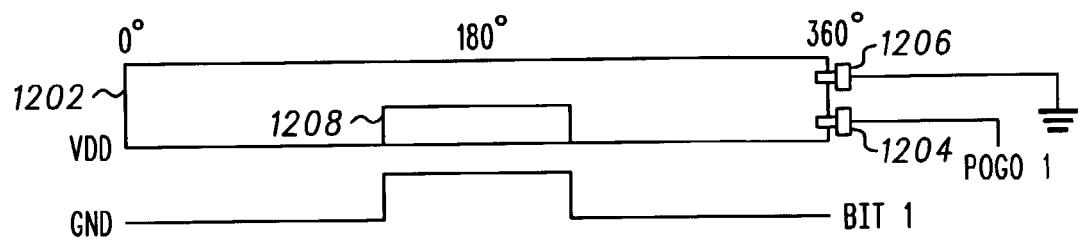
FIG. 12 is an exemplary one-bit rotary encoder and corresponding digital encoder output diagram.

FIG. 12 illustrates a first exemplary rotary encoder embodiment comprising a partially conductive strip 1202 with bit patterns formed thereon 1208. The strip 1202 is formed into a ring and fastened to one housing portion. At least two conductors, for example, pogo pins 1204 and 1206, are coupled to the other housing portion so that the pins are in contact with the conductive strip.

Figure 13:
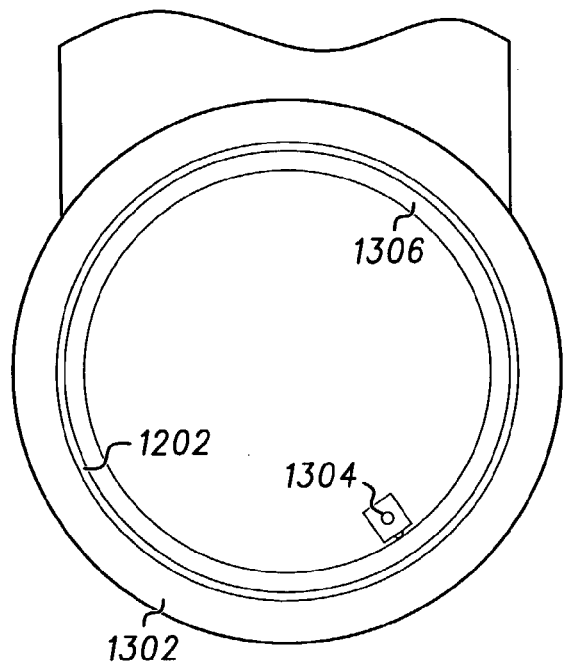
FIG. 13 is a top down exemplary view of the rotatable housing portion having a first exemplary rotary encoder.
Figure 14:
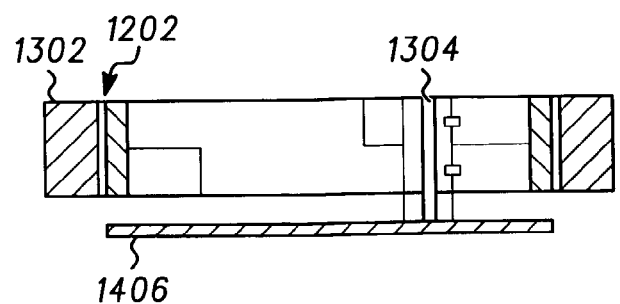
FIG. 14 is a section view of a portion of a rotatable housing portion.

In FIGS. 13 and 14, the conductive strip 1202 is disposed on an inner surface of the rotatable user interface 210 in the exemplary embodiment. Alternatively, the bit pattern 1208 may be formed directly on the surface of the rotatable user interface 210, for example by depositing conductive and non-conductive materials thereon. FIG. 13 illustrates a pogo pin mounting assembly 1304 mounted on an inner ring 1306 of the first housing portion 212, and FIG. 14 illustrates the pogo pin mounting assembly 1304 disposed on a circuit board 1406.

Figure 15:
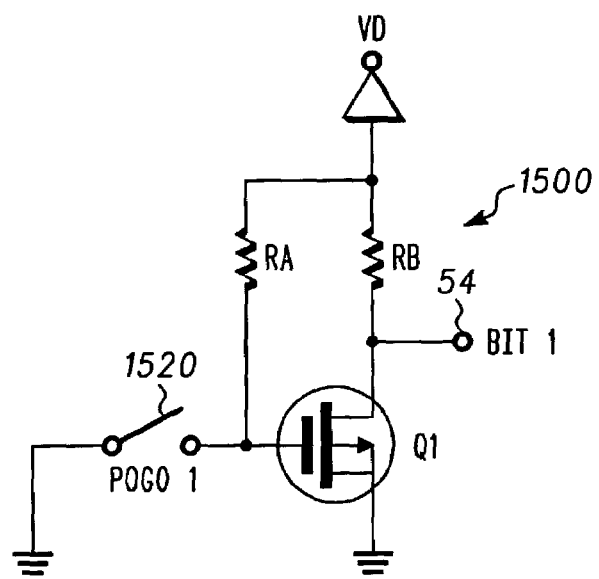
FIG. 15 is a first exemplary pull-down circuit.
Figure 16:
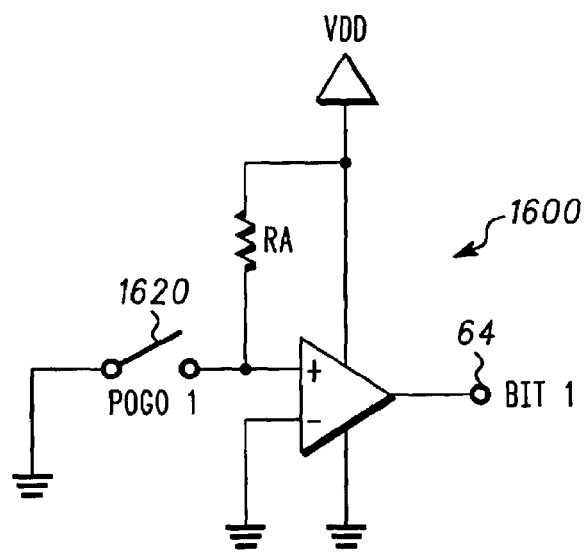
FIG. 16 is a second exemplary pull-down circuit.

The conductors of the rotary encoder are coupled to an electrical circuit that detects when an electrical connection between the conductors is made and broken by conductive and non-conductive portions of the strip. FIGS. 15 and 16 illustrate exemplary voltage pull-down circuits 1500 and 1600, respectively, with corresponding switches 1520 and 1620 representative of the contact made between the conductors of the rotary encoder. The generation of electrical connections is then sent to the processor 102. The processor 102 interprets the input signals from the rotary encoder and sends commands to the display to move the text accordingly.

The handheld device as shown in FIG. 17 is a clam style wireless communication device having two housing portions coupled together by a hinge. The hinge having at least one axis of rotation. The second housing portion 1702 include one or more displays 204 of the handset and a rotatable user interface 210 on a first housing portion 212. The configuration of keys 208 may be reconfigured in a variety of arrangements much as discussed above with the two housings in the open or closed positions. The first housing portion also includes a notch 1704 in the side of the housing portion. This notch 1704 provides access to the rotatable user interface 210 from the side of the device. FIG. 18 shows the device in the open position from the back view. This shows that the wheel 210 is accessible via the notch 1704.

FIG. 19 shows the device in the closed position with the first housing portion 212 and the second housing portion 1702 folded such that they are planarly adjacent to one another. In the closed position the notch 1704 allows the rotatable user interface 210 to be accessible by the user while the device is in the closed position. A second display 1902 can then be controlled by the rotatable user interface 210 to control motion. This can control motion in a gaming device or scroll information in radiotelephone mode such as contact information.

Figure 20:
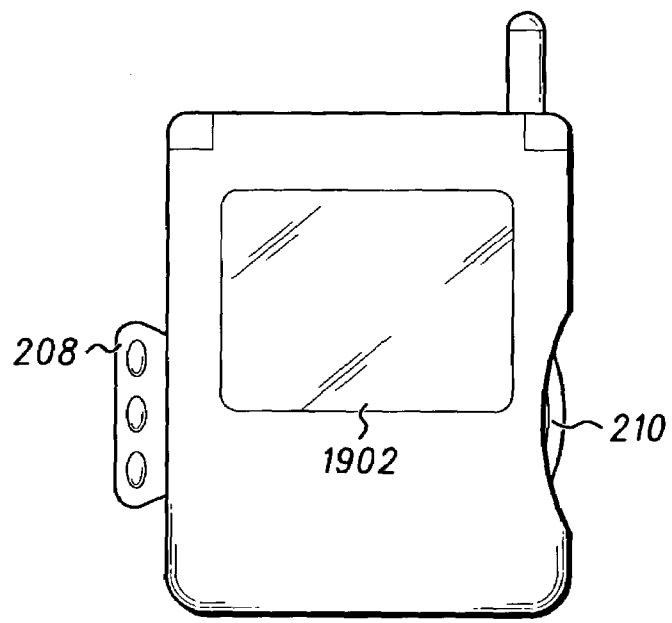
FIG. 20 is an exemplary front view of a housing in a closed configuration.
Figure 21:
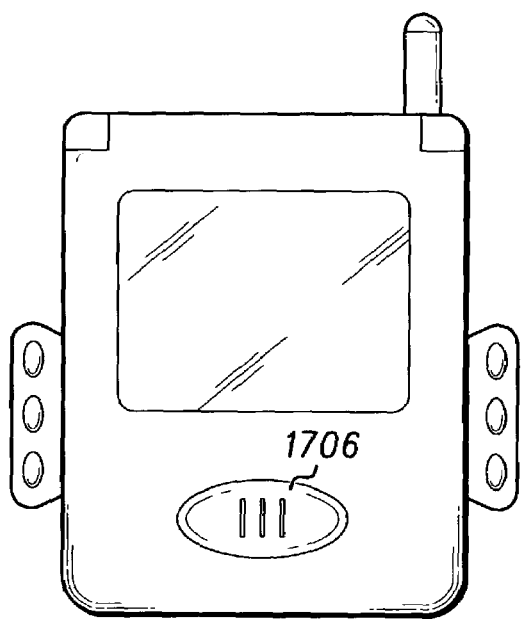
FIG. 21 is an exemplary view of a housing with a universal hinge in the closed position.

FIG. 20 shows the device with a clam style handset in an additional configuration. The rotating user interface 210 with configurable keys 208 positioned in the horizontal relationship with the two housings portions folded together. The display 204 may also be used when the hinge coupling the first housing portion and the second housing portion can rotate about two axis' allowing the display 204 to be exposed on the outside of the device, a second closed position giving the user a larger display. This is further illustrated in FIG. 21 showing the display 204 on the outside of the device while it is in the second closed position. The universal hinge allows the housing portion with the display to rotate 180 degrees and then fold together with the second housing portion such that the rotatable housing portion is closed between a portion thereof is accessible through the notch 1704. This allows the user to close the device and still access and navigate or control information on the display. In another exemplary embodiment not shown, the rotatable user interface is accessible from both sides of the device.

This disclosure is intended to explain how to fashion and use various exemplary embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A handheld electronic device comprising:
   a first housing portion;
   a rotatable user interface coupled to said first housing portion;
   a rotation sensor coupled to said rotatable user interface;
   a configurable user interface wherein at least a portion thereof is a configurable user interface movable portion, movable relative to said, housing portion and said rotatable user interface,
   wherein said rotatable user interface encompasses at least a portion of said configurable user interface; and
   a controller coupled to said, configurable user interface and said rotation sensor, operable to receive signals from said configurable user interface and said rotation sensor.

2. The device of claim 1, said controller is operable to detect incremental movement of said rotatable user interface in a first direction of rotation and a second direction of rotation opposite said first direction of rotation.

3. The device of claim 2,
   a second user interface coupled to said controller outputs a first function proportional to the amount of incremental change in rotation and relative to the first direction of rotation of said rotatable user interface, and outputs a second function proportional to the amount of incremental change in rotation and relative to the direction of rotation of said rotatable user interface.

4. The device of claim 3, said configurable user interface movable portion comprising a plurality of keys.

5. The device of claim 4, wherein said rotatable user interface rotates about a first axis.

6. The device of claim 5, wherein at least said configurable user interface movable portion of said configurable user interface is moveable about said first axis.

7. The device of claim 6, said rotatable user interface is a circular rotating user interface coupled to said first housing portion.

8. The device of claim 7 said circular rotating user interface is a steering control to facilitate a gaming function.

9. The device of claim 4, wherein said configurable user interface movable portion of said configurable user interface rotates from a first configuration to at least a second configuration, said rotation is relative to said first housing portion and said rotating user interface.

10. The device of claim 8, wherein said configurable user interface movable portion of said configurable user interface rotates from a first configuration to at least a second configuration, said rotation is relative to said first housing portion and said rotating user interface, wherein
said configurable user interface movable portion in said second position provides control buttons operative in conjunction with said steering control.

11. The device of claim 7, wherein said circular rotating user interface encompasses a third user interface.

12. The device of claim 11, said third user interface disposed upon a circular protruding portion of said first housing portion said third user interface having a plurality of keys and said circular user interface encompassing said circular protruding portion of said first housing portion such that said circular rotating portion rotates about said circular protruding portion.

13. The device of claim 5, a second housing portion having substantially the same size as said first housing portion,
wherein said second housing portion angularly displaces about a second axis and folds upon said first housing portion such that said first housing portion and said second housing portion are planarly adjacent, and
wherein a first portion of said rotating user interface is inaccessibly enclosed between said first housing portion and said second housing portion, and a second portion of said rotating user interface is accessible and not enclosed between said first and said second housing portions.

14. A handheld electronic device comprising:
a first housing portion;
a rotatable user interface coupled to said first housing portion wherein said rotatable user interface rotates about a first axis, and
wherein said rotatable user interface is a circular rotating user interface, and wherein said circular rotating user interface encompasses at least a portion of said configurable user interface;
a rotation sensor coupled to said rotatable user interface;
a configurable user interface wherein at least a portion thereof is a configurable user interface movable portion, movable relative to said housing portion and said rotatable user interface said configurable user interface movable portion comprising a plurality of keys,
wherein at least said configurable user interface movable portion of said configurable user interface is moveable about said first axis;
a controller coupled to said configurable user interface and said rotation sensor, operable to receive signals from said configurable user interface, said rotation sensor and to detect incremental movement of said rotatable user interface in a first direction of rotation and a second direction of rotation opposite said first direction of rotation; and
a second user interface coupled to said controller outputs a first function proportional to the amount of incremental change in rotation and relative to the first direction of rotation of said rotatable user interface, and outputs a second function proportional to the amount of incremental change in rotation and relative to the direction of rotation of said rotatable user interface.

* * * * *